UNITED STATES PATENT OFFICE.

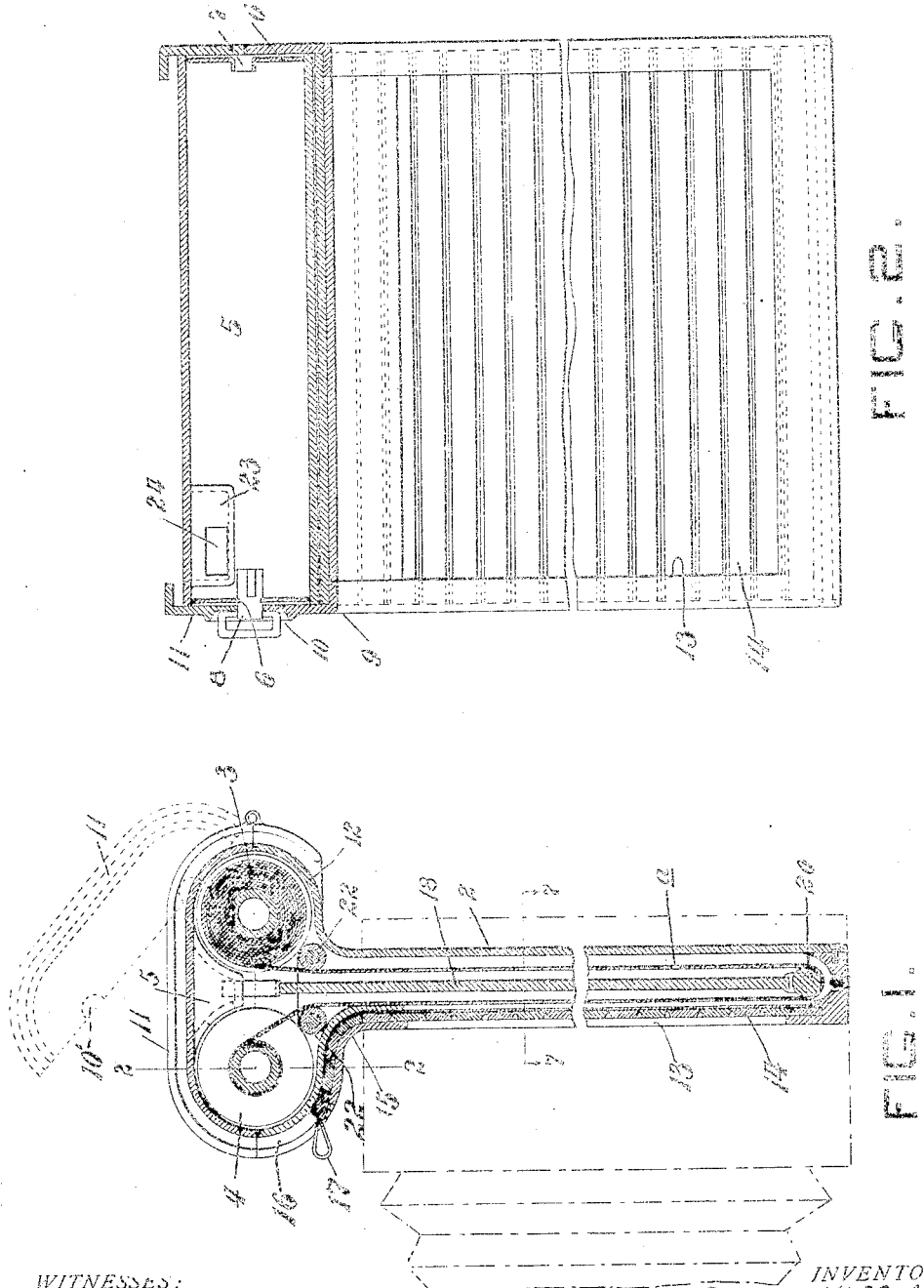

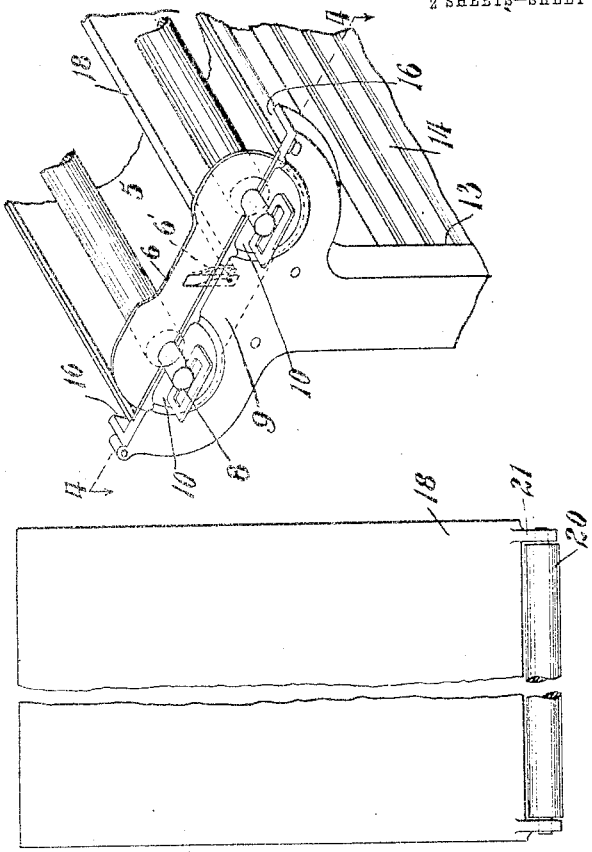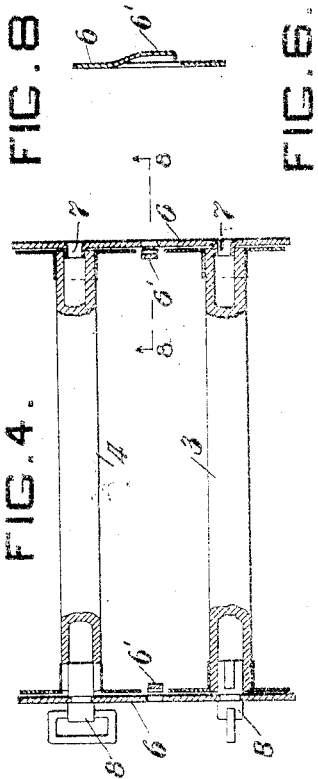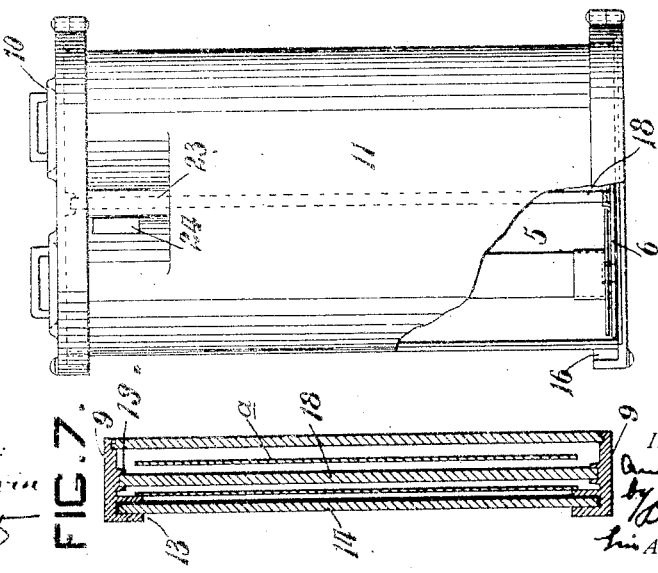

ANDREW M. VALE, OF SHERIDANVILLE, PENNSYLVANIA.

FILM ATTACHMENT FOR CAMERAS.

1,036,385.

Specification of Letters Patent. Patented Aug. 20, 1912.

Application filed June 27, 1911. Serial No. 635,540.

*To all whom it may concern:*

Be it known that I, ANDREW M. VALE, a citizen of the United States of America, residing at Sheridanville, in the county of Allegheny and State of Pennsylvania, have invented a new and useful Improvement in Film Attachments for Cameras, of which the following is a full, clear, and exact description.

This invention relates to film attachments for cameras by which the primary object sought to be provided for is a device for presenting an ordinary flexible roll film to a plate camera in such manner that focusing may be had during the intervals between exposures. That is, I aim to provide apparatus for the application of the film to a camera employing a ground glass or similar focusing screen; it being a well-known fact that the construction of the ordinary film camera is such as to preclude focusing through the lense on a screen at the rear of the camera, as in the ordinary plate camera.

As a device of the above mentioned character my invention will be found to present an apparatus light in weight and durable in construction, and which is inexpensive to manufacture.

The invention also contemplates an arrangement by means of which the apparatus may be symmetrically shaped and evenly balanced with respect to the main body of an ordinary camera.

I also aim to provide other details of construction, as will be hereinafter more fully described.

I will now described my invention so that others skilled in the art to which it appertains may understand and construct the same, it being premised, however, that changes may be made in the specific construction shown in the drawings without departing from my invention, and I do not therefore desire to limit myself thereto.

The particular embodiment of my film attachment shown in the accompanying drawings takes the general shape of the film attachment disclosed in Letters Patent No. 968,716, granted to me August 30th, 1910.

Figure 1 is a vertical sectional view illustrating one embodiment of my invention and showing, in dotted line, its application to a camera; Fig. 2 is a front elevation of the same, and showing in cross-section on the line 2—2 of Fig. 1, the upper part of the device, or the spool containing chamber; Fig. 3 is a top plan view showing the cover partly broken away; Fig. 4 is a top plan view of the spool and the spool holding members which are received by the spool containing chamber at the top of the frame, being partly sectioned on the line 4—4 of Fig 6; Fig. 5 is an elevational view showing the partition or slide which separates, in the film presenting frame, the incoming portion of the film from the outgoing portion of the film; Fig. 6 is a fragmentary perspective view showing one of the spool holding members in position within the spool chamber; Fig. 7 is a horizontal sectional view taken on the line 7—7 of Fig. 1, and Fig. 8 is a section on the line 8—8 of Fig. 4.

It is apparent that to make a film adapter for a plate camera of such character as will obviate the necessity of changing the rear construction of the camera box, and which will permit of embodiment in apparatus which is symmetrical in appearance, it is necessary that such apparatus occupy very little room at the rear of the camera and have the same facility of application and adjustment common to ordinary glass plate holders. I therefore provide a form of device whereby the film is caused to be presented in a true focal plane to the camera exactly in the same manner that a plate holder is presented and withdrawn from the camera box, and to bring this about I form a frame portion 2 which in general appearance is similar to and is adapted to be received by the camera in the same manner as the ordinary plate holder of the plate camera. Through this frame the film *a* is adapted to be fed from the film delivery spool 3 to the takeup spool 4 both of which spools are mounted in the chamber 5 carried by one end of this frame 2. The film delivery and takeup spools 3 and 4 may be mounted so as to be interchangeable as in the ordinary film camera, and I have shown such mountings as being carried by the thin plates 6, made of metal or other suitable material, and which are received at each end of the chamber 5, as shown in Figs. 2, 4 and 6. One of these plates carries the circular bosses 7, each of which freely receives one end of a film spool, and the other plate carries the usual thumb pieces 8, by means of which the spools may be operatively rotated. These plates being spaced apart by the spools 3 and 4 take a position as above stated, at each end of the chamber 5, and when in this position the thumb pieces 8 project beyond the side wall 9 of the box sufficiently to permit of the thumb pieces 8 being received by the sockets or recesses 10, as shown in Figs. 2 and 6.

The upper part of chamber 5 preferably takes the form of the cover 11, which associates with the lower portion 12 of the chamber 5, on a median horizontal line,—that is, a line passing directly through the axes of the two spools and has in its end walls the semicircular notches or sockets 10' registering and coöperating with the recesses 10 to receive, without admission of light rays, the shank of the thumb pieces 8 when the cover 11 is in closed position. This construction enables the chamber to be opened for free access and ready removal and replacement of the film and film spools.

The forward part of the frame 2 has the opening 13 by means of which the sensitized face of the film is presented to the camera for exposure. This opening 13 may be closed by means of a suitable roll-shutter or curtain 14, which passes upwardly from the frame 2 around the curved wall 15 to the guide-ways 16 extending from each end-wall of the chamber 5. These guide-ways 16 overhang the edge of the curtain 14, when the said curtain by means of a suitable finger piece 17 is caused to be withdrawn from the frame 2 for exposure of the film. The guideway thus formed at each end of the chamber 5 not only enables the curtain 14 to be readily and easily withdrawn and inserted in the frame 2, without sticking or binding, but also contemplates neat disposition of the withdrawn shutter by causing it to take a position embracing or lying flat against the outer face of the chamber 5.

The frame 2 has the central partition or slide 18 which separates the incoming portion of the film passing from the delivery spool from the outgoing portion of the film passing to the takeup spool. This partition 18 is preferably slidingly and removably received by the grooves 19 at each side of the frame 2, as shown in Fig. 7. The lower end of the slide 18 carries the roller 20 around which the film passes in its travel through the frame. This roller 20 as shown in Fig. 5 may be terminally carried by the suitable lugs 21 formed on the lower end of the slide 18; this slide being preferably cast from aluminium so as to provide for integral formation of the ear pieces or lugs 21, and resultant simplicity of construction.

The film may be threaded from the delivery spool to the take-up spool while the spools repose in the chamber 5, and before the insertion of the slide 18. With the insertion of the slide 18 within the grooves 19 the roller 20 negotiates with the rear face of the film, carrying the film downwardly into the frame in loop fashion over the guide rollers 22 at the top of the frame as shown in Fig. 1. The slide 18 is held in inserted position against displacement by means of the spring tongues 8' carried by the plates 6 and which snap over and lie above the top edge of the slide at each side thereof when the said slide is in position.

The cover 11 has the depression or countersunk portion 23, which projects downwardly between the two rollers 3 and 4, and has the usual sight aperture 24 by means of which the film numbers may be ascertained as the film is caused to pass from the delivery spool to the take-up spool. This aperture is covered with the usual non-actinic strip so as to prevent the entrance of actinic light rays.

The operation of my device will be readily understood from the foregoing description. Assuming that the film is threaded from the delivery spool 3 to the takeup spool 4, and the slide 18 inserted in the frame 2 so as to bring the film into operative position within the frame 2, and that the shutter 14 is in closed position, the frame 2 may be inserted in the camera, occupying the same position as in the case of an ordinary plate holder. Should it be desired to focus the camera by means of the rear screen such as the ground glass in the ordinary plate camera, the frame 2 is withdrawn from the camera in the same manner as an ordinary plate-holder to permit of such focusing. After focusing and when it is desired to make an exposure, the slide 14 is withdrawn by means of the finger strap or piece 17. By means of the shutter 14 it will be apparent that focusing may be done before each exposure.

The advantages of my invention will be found to reside not only in the fact that an ordinary plate camera may be readily converted into a film camera with attending advantages of focusing by means of ground glass or a similar screen, but that a form of apparatus is provided whereby the film may be threaded from one spool to another without difficulty and in which binding, sticking and marking or scoring of the film is absent.

Many changes may be made in the construction shown without departing from the true spirit of my invention. The device is small and compact, and presents a neat and symmetrical appearance, with or without association with the camera box.

Having thus described my invention, what I claim and desire to secure by Letters Patent is:—

1. In a device of the character described, a delivery frame adapted to be slidingly received by and present a film to the camera, and having at one end a closed chamber, and film spool mounting means removably carried in the chamber.

2. In a device of the character described, a delivery frame adapted to be slidingly received by and present a film to the camera, and having at one end a chamber for the reception of film spools, said chamber being formed in two parts with the line of division lying in a plane passing through the axes of the spools.

3. In a device of the character described, a delivery frame adapted to be slidingly received by and present a film to the camera, and having at one end a closed chamber for the reception of the film spools, and means for operatively mounting the spools within the chamber, comprising separately and pieces, removably receivable by the chamber.

4. In a device of the character described, a delivery frame adapted to be slidingly received by and present a film to the camera, and having at one end a closed chamber for receiving delivery and take-up spools whereby the film is caused to be fed so as to be presented to the camera, and a removable slide separating the incoming portion of the film from the outgoing portion; and a film guide roller carried at the lower end of the slide.

5. In a device of the character described, a delivery frame adapted to be slidingly received by and present a film to the camera, and having at one end a closed chamber for the reception of film spools, the delivery frame having a forward opening to permit of exposure of the film, a curtain for closing the opening, and means for guiding the curtain and so disposed as to cause the curtain to lie, when in its withdrawn position, adjacent the outer face of the chamber.

6. In a device of the character described, a delivery frame having an exposure opening therein adapted to be slidingly received by and present a film to the camera, and having at one end a closed film spool containing chamber, the walls of which are provided with guide-ways and a curtain for controlling the exposure opening in the frame and mounted to travel in the guideways.

7. In a device of the character described, a delivery frame having an exposure opening therein adapted to be slidingly received by and present a film to the camera, and having at one end a film spool containing chamber, provided with outwardly extending end walls, carrying guide ways and a shutter for closing the exposure opening in the frame, and mounted to travel in the guideways.

8. In a device of the character described, a delivery frame having an exposure opening therein adapted to be slidingly received by and present a film to the camera, and having at one end a film spool containing chamber, and a shutter for closing the exposure aperture in the delivery frame, the chamber having a guide way for the shutter extending along and shaped to conform to the curvature of the chamber wall.

9. In a device of the character described, a delivery frame adapted to be slidingly received by and present a film to the camera, and having at one end a chamber for receiving film spools, means separate from the chamber for operatively mounting the spools within the chamber, and means for separating the incoming portion of the film within the chamber from the outgoing portion of the film, said separating means being adapted to be received by the frame after the film has been threaded from one spool to another spool.

10. In a device of the character described, a delivery frame adapted to be slidingly received by and present a film to the camera, and having at one end a closed chamber, spool mounting members adapted to be removably received by the chamber, and a removable slide carried by the frame, for separating the incoming portion of the film from the outgoing portion.

11. In a device of the character described, a delivery frame adapted to be slidingly received by and present a film to the camera, and having at one end a chamber for receiving film spools; the frame having a substantially central guideway and a slide adapted to be received by the guideway of the frame, whereby the incoming portion of the film is separated from the outgoing portion; the slide being removably receivable by the frame so that the film may first be threaded from one spool to another and then the slide inserted for the purpose of carrying the film down into the frame.

12. In a device of the character described, a delivery frame adapted to be slidingly received by and present a film to the camera, and having at one end a chamber for receiving film spools, means for operatively mounting the film spools in the chamber, a slide adapted to be received by the frame and separate the incoming portion of the film from the outgoing portion, and means carried by the spool mounting means, for holding the slide in its inserted position.

13. In a device of the character described, a delivery frame adapted to be slidingly received by and present a film to the camera, and having at one end a chamber for receiving film spools, and means for operatively mounting the spools within the chamber, comprising a holder separable from the chamber.

14. In a device of the character described, a delivery frame adapted to be slidingly received by and present a film to the camera, and having at one end a chamber for receiving film spools, and means for operatively mounting the spools within the chamber, comprising a separable holder embodying end supporting members adapted to detachably receive the spools.

In testimony whereof, I have hereunto set my hand.

ANDREW M. VALE.

Witnesses:
M. A. BARTH,
MOSES A. KELLER.